June 5, 1945. W. F. HALL 2,377,550
APPARATUS FOR ELECTRO-GALVANIZING
Filed Dec. 2, 1940 7 Sheets-Sheet 1

INVENTOR
WESLEY F. HALL
BY
ATTORNEYS

June 5, 1945. W. F. HALL 2,377,550
APPARATUS FOR ELECTRO-GALVANIZING
Filed Dec. 2, 1940 7 Sheets-Sheet 2

INVENTOR
WESLEY F. HALL
BY
ATTORNEY

June 5, 1945. W. F. HALL 2,377,550
APPARATUS FOR ELECTRO-GALVANIZING
Filed Dec. 2, 1940 7 Sheets-Sheet 5

INVENTOR
WESLEY F. HALL
BY
ATTORNEY

June 5, 1945. W. F. HALL 2,377,550
APPARATUS FOR ELECTRO-GALVANIZING
Filed Dec. 2, 1940 7 Sheets-Sheet 6

INVENTOR
WESLEY F. HALL
BY
ATTORNEY

June 5, 1945. W. F. HALL 2,377,550
APPARATUS FOR ELECTRO-GALVANIZING
Filed Dec. 2, 1940 7 Sheets-Sheet 7

INVENTOR
WESLEY F. HALL
BY
ATTORNEY

Patented June 5, 1945

2,377,550

UNITED STATES PATENT OFFICE 2,377,550

APPARATUS FOR ELECTROGALVANIZING

Wesley F. Hall, Matawan, N. J., assignor to Hanson-Van Winkle-Munning Company, Matawan, N. J., a corporation of New Jersey Application December 2, 1940, Serial No. 368,193

7 Claims. (Cl. 204—207)

This invention relates to an electrolytic apparatus for cleaning and plating metal, and more particularly to an improved electro-galvanizing machine for continuously cleaning and plating metal sheets. The apparatus is illustrated and described as applied to the treatment of iron or steel sheets, but this invention is not limited to the treatment of sheets and is adapted to be utilized as a continuous process for treating long lengths of metal strip in the form of ribbons, wires and the like.

The principal object of this invention is to provide an improved apparatus whereby relatively wide rolled steel sheets or plates can be continuously electro-galvanized to provide the surface with an adherent corrosion resistant coating of high ductility.

Another object is to provide an apparatus of the character described in which metal plates or strips may be cleaned and plated over their entire surface in a continuous operation and by the use of a single machine.

Another object of this invention is to provide an apparatus for continuously cleaning and electro-galvanizing metal sheets or strips wherein the steps in the method are performed successively as the material is moved along through the machine. To this end, suitable means is provided whereby the sheets are subjected to alkaline electrochemical cleaning, pickling, anodic acid cleaning, rinsing, electroplating, and finally rinsing and drying to produce a finished galvanized sheet product.

Another object is to devise an electro-galvanizing machine which is fully automatic and is adjustable to handle sheets or strips of different width.

Another object is to provide a compact machine through which metal sheets or strips may be passed at a controlled speed while being automatically cleaned and electro-galvanized utilizing high current densities on the order of 200 to 500 amperes per square foot.

Another object is to provide an electro-galvanizing machine for cleaning and plating steel sheets in a continuous and automatic process and wherein the weight of the metal deposited on the sheet material is controlled by the electric current flowing from the anodes to the metal sheet and the speed at which the material passes through the plating tanks.

Another object is to devise a machine for cleaning and plating metal sheet or strip material at high current densities whereby a dense, non-porous, smooth, uniform, adherent coating is deposited on the surfaces of the metal.

Another object is to provide a machine having co-operating cleaning, rinsing and plating units through which the material being treated is moved by means of a driven roller mechanism. Each unit is constructed so that it can be readily enlarged, if desired, to accommodate material of greater dimensions without changing the principal features of construction and method of operation.

Another object is to provide an improved electroplating means for electro-galvanizing metal comprising positioning upper and lower anode members in such a manner that the sheet material to be electro-galvanized can be guided therebetween and simultaneously plated on all surfaces of the sheet.

Another object is to provide a machine of the type described wherein the lower anodes are centrally supported by a bar or other suitable means which is rubber covered leaving only the outer end portion of the anodes to be supported. This permits the inserting of additional anode members in between and adjacent the others so as to extend outwardly from the center line of the machine enlarging the plating compartment to accommodate wider sheet material.

Another object is to provide an improved electroplating machine of the character described which is arranged to present a greater anode area adjacent the center of the sheet being treated than at the edges to reduce the tendency to deposit more plate along the edges than at the center. In this way, a coating of substantially uniform thickness can be plated onto the surfaces of the sheet material.

Another object is to construct an improved electro-cleaning and plating machine wherein each of the tanks making up the machine and adapted for holding treating solution comprises a central compartment through which the sheet material passes while in contact with cleaning or plating solution. In the preferred arrangement solution overflow compartments are provided adjacent the ends of the central section and suitable means including a pump is provided to withdraw the solution collected in the overflow compartments and return it back to the central compartment. The level of the treating fluid in the treating tank is maintained at sufficient height to completely cover the metal sheet being treated as it is moved therethrough. In the electro-cleaning and plating units, the electrolyte is kept high enough to submerge the upper electrode members to effect treatment of both upper and lower surfaces of the sheet material. When it is desired to operate the machine leaving out one or more of the units, it is only necessary to disconnect the circulating pump motor for the particular unit or units to be omitted, whereby the electrolyte or solution for treating the sheet falls below the path of the sheet so that it passes idly between guide rolls to the next unit. This increases the utility of the cleaning and plating machine of this invention.

These and other objects and advantages will be apparent from the following description taken in connection with the drawings in which.

General construction

Figure 1:
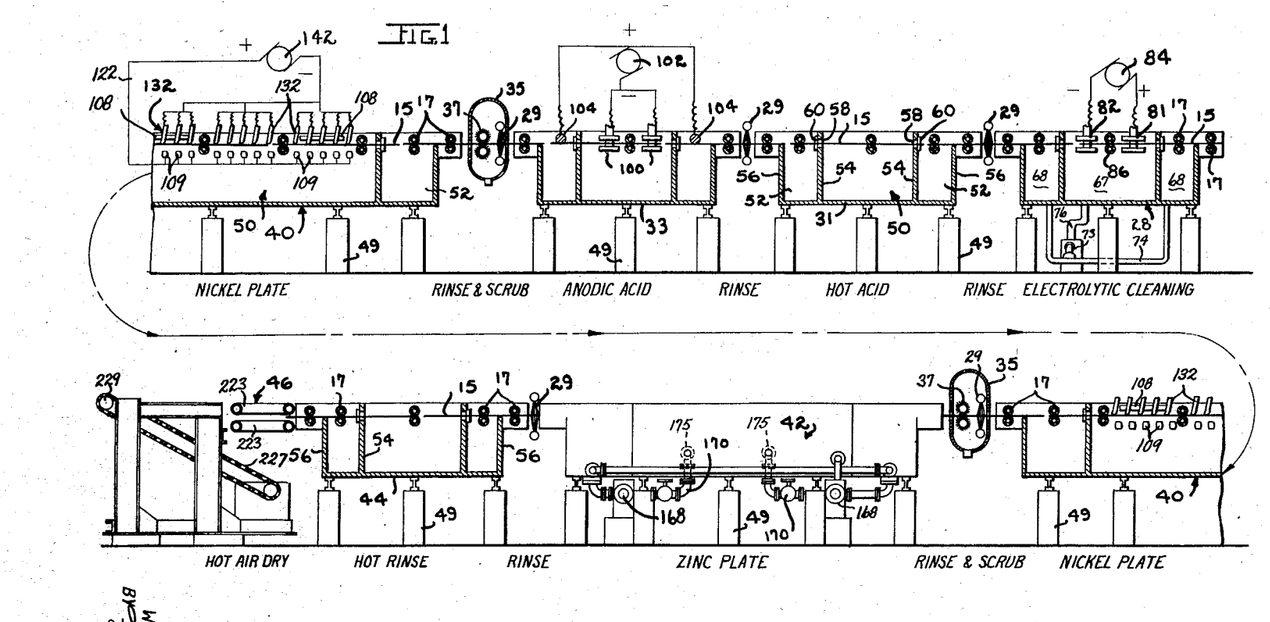
Figure 1 is a diagrammatic elevation view of the electro-galvanizing machine of this invention.
Figure 2:
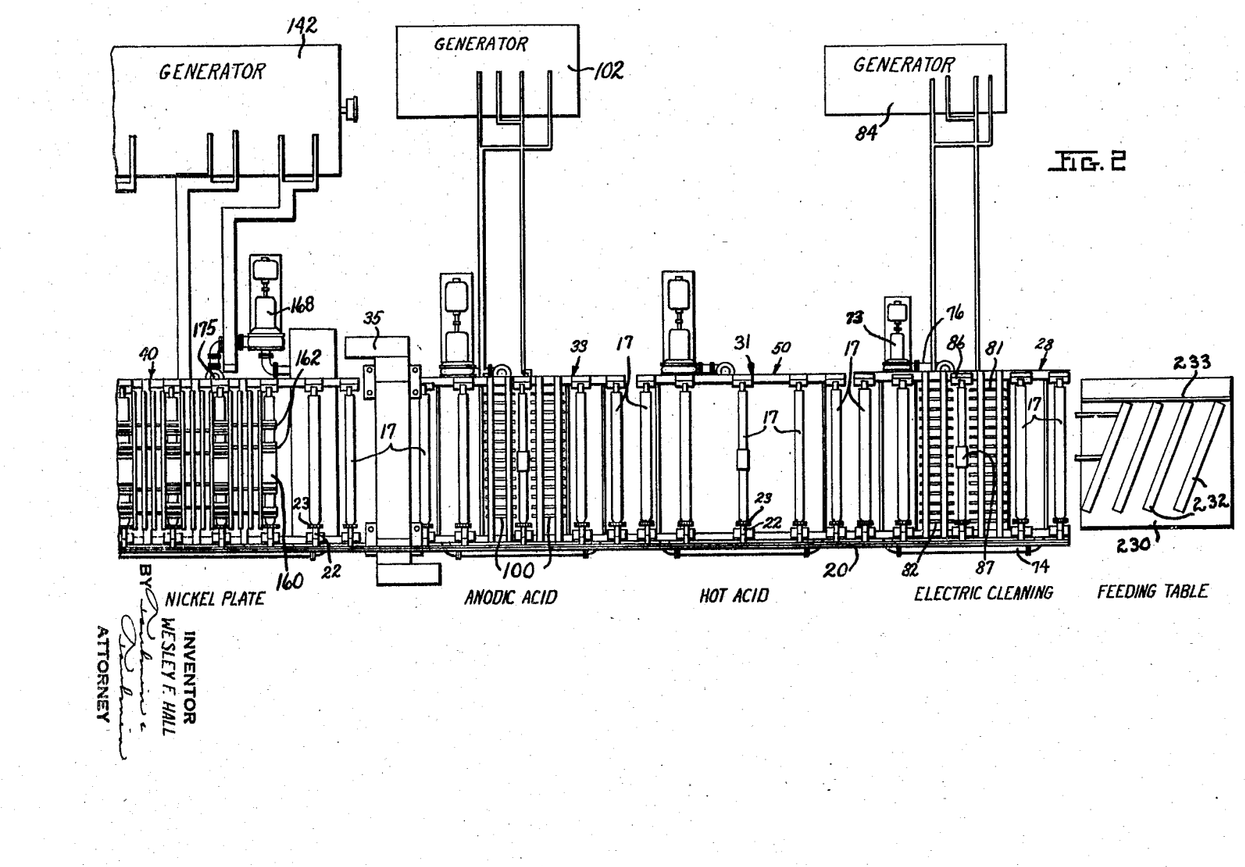
Figure 2 is a similar diagrammatic plan view of the machine illustrated in Figure 1.
Figure 3:
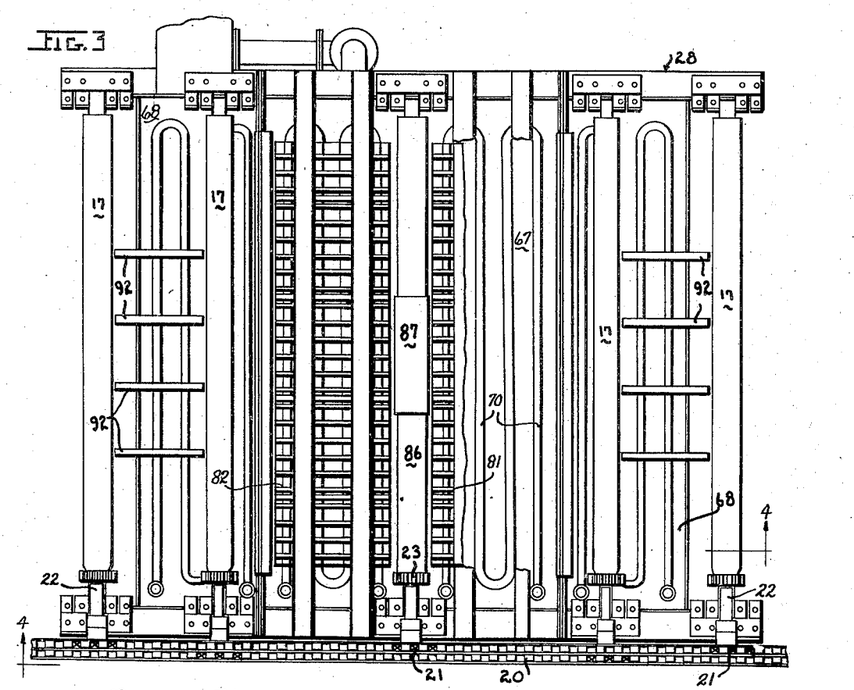
Figure 3 is an enlarged plan view of the electro-cleaning unit, certain parts being broken away to more clearly illustrate the construction of the cleaning unit.
Figure 4:
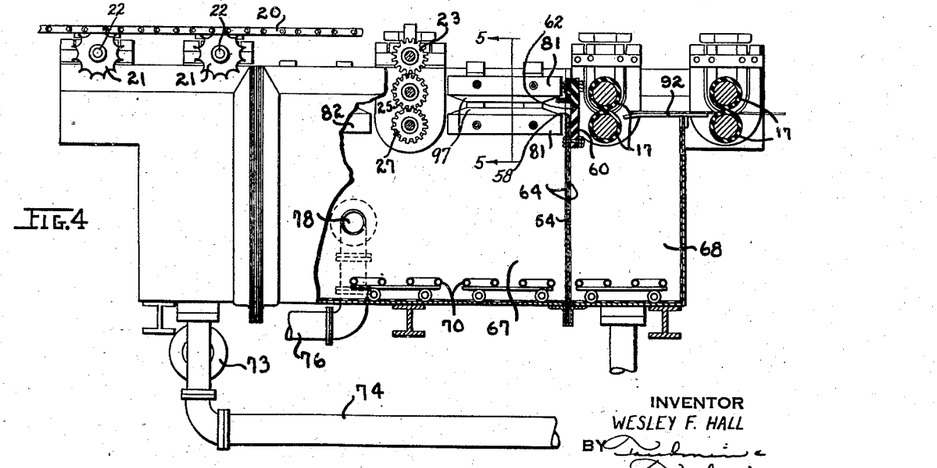
Figure 4 is an elevation view of the electrolytic cleaning unit shown in Figure 3, certain parts being shown in section.

Referring to the drawings in detail, as illustrated in Figures 1 and 2, the electro-galvanizing machine of this invention comprises electro-cleaning, pickling, rinsing and plating units through which the metal plates or strip material, generally designated 15, is moved. For conveying the sheet material through the various treating units of the machine, pairs of coacting rubber or rubber covered rolls 17 are mounted for rotation at suitably spaced intervals longitudinally of the machine, which engage the sheet material and advance it along. The rolls 17 are preferably driven synchronically by means of an endless chain means 20 arranged at one side of the machine as illustrated in Figures 3 and 4. A sprocket 21 keyed to the pinion shaft 22 drives the pinion 23 arranged to engage the gear 25 on the end of the upper feed roll which meshes with the gear 27 on the lower feed roll shaft. Similar sprocket and gear mechanism is provided for each set of rolls which is driven in unison by movement of the chain 20.

The sheet material is passed first through an electro-cleaning tank 28 where it is subjected to electrolytic cleaning, following which the sheet is guided through a water spray 29 and into a hot acid pickling tank 31. Thereafter, the material is spray rinsed and moved to the anodic acid cleaning tank 33, then through a rinsing and scrubbing means 35 which comprises the spray rinsing member 29 and scrubbing opposed rotatable brushes 37. Following the scrubbing and rinsing of the sheet material which has been anodically treated, it is passed through a nickel-plating tank, generally designated 40, after which it is again moved through a rinsing and scrubbing compartment 35 and then conducted into a zinc plating tank, generally designated 42. After zinc plating the metal sheet material, it is advanced through a cold spray rinse 29 and a hot rinsing tank 44, after which the sheet is moved over the hot air drying means, generally designated 46, providing a finished dry galvanized sheet.

The different units making up the machine of this invention are suitably mounted on a supporting base means 49, as illustrated in Figure 1. Each of the tanks containing solution for treating the sheet material comprises a central compartment, such as generally indicated at 50, with solution overflow compartments 52 arranged adjacent the entrance and exit side of the central compartment. The central tank portion 50 comprises the partitioning end walls 54 which extend above the outside end walls 56 of the overflow compartments 52 over the edge of which the strip material 15 is adapted to pass, as illustrated in Figure 1. The uppermost part of the walls 54 is provided with an aperture 58 which is suitably closed by rubber dam means 60. This rubber dam member is provided with a central slot 62 through which the metal sheet is adapted to pass and treating solution is suitably circulated by means of a pump from the overflow compartments 52 into the central section 50, filling this section and overflowing the walls 54 into the outer compartments 52. Preferably, the tanks for containing the treating solution are made of metal and lined with rubber or equivalent material, such as illustrated at 64 in Figure 11. Wooden tanks may be used if desired. In this connection, it will be understood that all parts of the machine which come in contact with electrolyte and chemically treating solutions are preferably coated with rubber or suitable insulating material so as to adequately protect the parts against corrosion.

The pumps and conduits for handling acids and similar highly corrosive substances are made of acid resisting materials such as "Duriron" or the like.

Electrolytic cleaning tank construction

Figure 5:
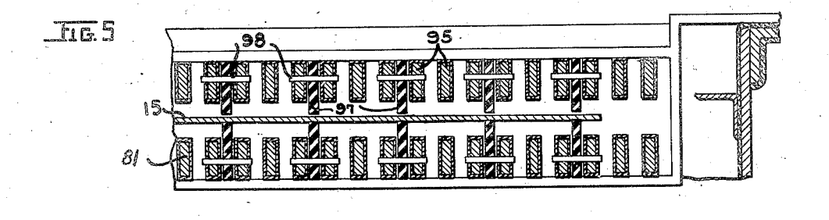
Figure 5 is a fragmentary detail view taken on the line 5—5 in Figure 4 and looking in the direction of the arrows.

As illustrated in Figures 3, 4 and 5, the electro-cleaning tank 28 comprises the central and overflow compartments 67 and 68, respectively, which are arranged to be heated by means of the steam coils 70 positioned in the bottom of the tank compartments. The cleaning solution is circulated from the overflow compartments 68 to the central compartment 67 by means of a pump 73 which is connected to the conduit 74 interconnecting the overflow compartments and returns the fluid through the conduit 76 to the central tank compartment 67 through the inlet 75. A single pump is used where the tanks are relatively small and the amount of solution to be handled is not too large. The overflow compartments are interconnected so that the solution in the overflow compartments can be maintained at substantially the same level.

In the uppermost part of the central tank portion 67 are arranged spaced anode and cathode members 81 and 82, respectively. A generator means 84 is connected therewith to supply the electric current. The sheet material being treated is passed along in between the spaced apart anode and cathode members 81 and 82, as illustrated in Figure 4, the sheet being moved along between the electrodes by means of the guide rolls 86. The central guide rolls 86 comprise an enlarged middle section 87 for engaging the sheet and guiding it along through the solution and between the electrodes. At the opposite ends of the tank are arranged the wringer rolls 17, one set of rolls being positioned over the overflow compartment 68, as illustrated in Figure 4. Suitable strip guide means 92 is provided between the wringer rolls 17 to support the sheet. The sheet passes over the wringer rolls 17 and through the rubber dam board 60 into the central compartment 67 between the anode and cathode members while covered with electrolyte. The wringer rolls 17 at the end of the electro-cleaning tank remove substantially all the liquid from the sheet material as it is passed along therebetween. Where desired, suitable means may be provided for draining any liquid collected by the outer wringer rolls back into the overflow compartment 68, particularly when expensive treating solutions are being used.

As illustrated in Figure 5, the electrodes comprise lead covered bars 95 which are spaced apart vertically and longitudinally with vertically arranged guide members 97 suitably fastened at spaced intervals to the electrode members 95 as at 98. The sheet material 15 is adapted to pass along in between the opposite edges of the guide members 97 so that the sheet is maintained equidistant between the opposed ends of the vertically spaced electrodes. The guide members 97 are preferably made of "Micarta," or similar electrically insulating material, such as hard rubber, glass, etc., which is not attacked by the electrolytic cleaning solution ordinarily employed. Alkaline or caustic solution may be used as the cleaner depending upon the cleaning required to be done. The particular composition of the various cleaning and plating solutions forms no part of the invention claimed in this application, and it will be understood that various kinds of treating solution may be used in utilizing the apparatus and method herein illustrated and described.

Pickling unit

The tank 31 is constructed similarly as the electro-cleaning tank with the omission of the electrodes. This tank is filled with pickling acid which is maintained hot by suitable base exchange heating means, the hot acid being pumped into the central compartment and circulated over the sheet similarly as in the electro-cleaning tank. In the handling of acids, suitable acid resisting equipment is used, as heretofore mentioned.

Where, however, it is desired to subject the sheet material to electrolytic pickling, the tank 31 may be equipped with electrodes and supplied with electric current from a generator similarly as shown for the electro-cleaning tank 28.

Anodic acid cleaning unit

After the sheet material has passed through the spray rinse following the hot acid pickling, it is conducted into the anodic acid tank 33, which tank is constructed similarly as the electrolytic cleaning tank 28. In this instance, however, the spaced apart electrodes 100 are made the cathode and the strip material the anode by the connections made to the generator 102, as shown in Figure 1. Anodic electrical contact is made with the sheet by means of the contact rolls 104 positioned at each end of the tank over the overflow compartments.

The use of electric current accelerates the chemical action of the acid. In addition, mechanical cleaning action is produced by the bubbles of oxygen evolved on the sheet surfaces which are swept away by the passing of the electric current form the sheet to the cathode electrodes and the forced circulation of the electrolyte over the sheet.

Electroplating unit construction

Following the anodic acid cleaning of the strip material, it is rinsed and scrubbed by means of rotating brushes 37, whereupon the strip is passed into the first electroplating unit wherein a coating of nickel is plated on the entire surface of the strip material. After coating the sheet with nickel, the sheet is then rinsed and scrubbed and finally zinc plated, as illustrated in Figure 1. The nickel and zinc plating units are of similar construction and are typically illustrated in Figures 8 to 13, inclusive.

Figure 8:
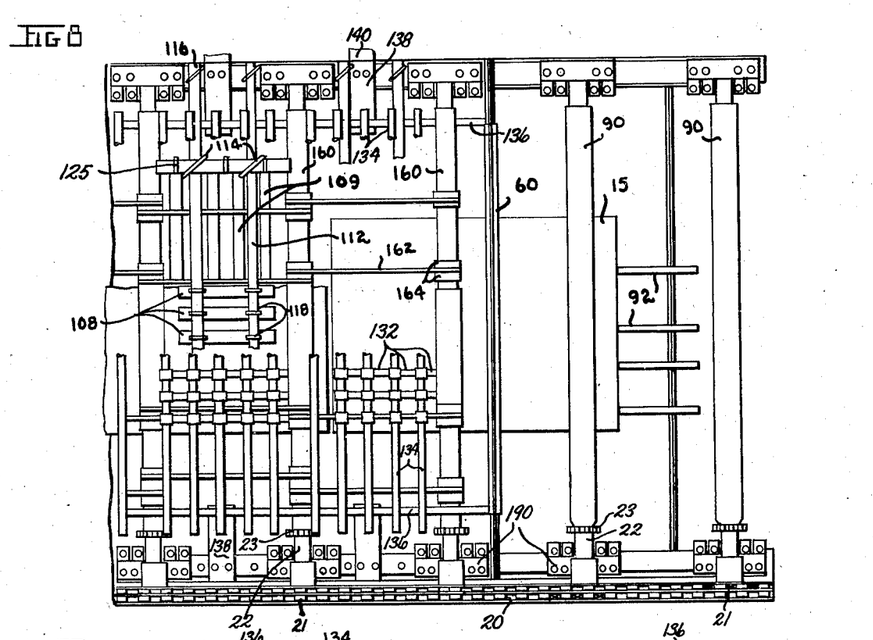
Figure 8 is a plan view, partly broken away, showing the construction of the electroplating units.
Figures 10, 12, 13:
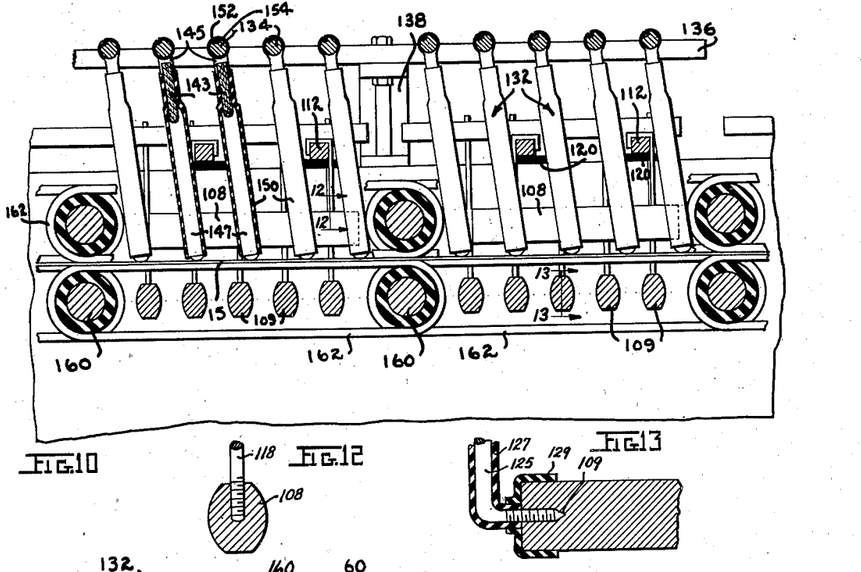
Figure 10 is an enlarged detail view of the electroplating compartment illustrating the positioning of the anodes and spaced cathode finger members and guide roller members for moving the sheet therebetween.
Figure 12 is a detail view showing the method of supporting the upper anode bars and taken substantially on the line 12—12 of Figure 10.
Figure 13 is a similar detail view illustrating the method of supporting the lower anodes and taken substantially on the line 13—13 in Figure 10.

The sheet material 15 is passed over the wringer rolls 90 and strip guide means 92 and through the rubber dam board 60 into the central plating compartment having spaced upper and lower anodes 108 and 109, respectively. The anode members comprise bars of pear-shaped cross section which are arranged in spaced upper and lower layers extending crosswise of each other, the layers being spaced apart an equal distance from the center line along which the metal strip material is moved. The crosswise arrangement of the anodes causes better contact of the plating solution, when circulating with the anodes than where the anodes are all parallel. This is due to the retardation of the circulating liquid and the irregularity of flow of said liquid in the crosswise arrangement. Suitable hanger bars 112 are provided for supporting the upper anode bars 108 on the tank and U-bolt or clamp means 114 is used for fastening the hanger bars 112 to the frame means 116 supported on the ends of the tank, as illustrated in Figure 8. J-bolt members 118 are mounted on the hanger bars 112 and the lower end is threaded into the anode bar as illustrated in Figure 12. The anode hanger bars 112 upon which the J-shaped rod members are mounted are supported on electrical insulating base means 120 and the bar 112 is electrically connected to a busbar 122 which is connected to the positive electrode of the generator.

Figure 9:
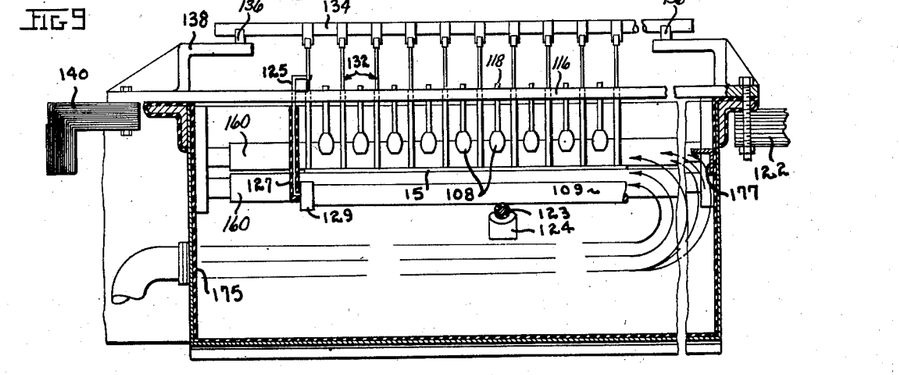
Figure 9 is a sectional view taken transversely of the electroplating units and partly broken away illustrating the arrangement of the guide rollers and anodes.

The lower anode bar means 109 are arranged transversely of the tank and are provided with a central supporting rod 123 which is rubber coated. This rod is mounted on the base means 124 and is adapted to provide a central support for the lower anodes, as shown in Figure 9. In this way, only one of the outer ends of the lower anodes is required to be supported so that additional anode bars can be introduced in between the lower anodes and supported at one end and near the center by the rod 123 whereby the machine can be modified to accommodate different widths of sheet material. The outer ends of the anode bars 109 are also supported on J-shaped rod members 125 which are longer in length than the members supporting the upper anodes and are threaded into the ends of the anode bars as illustrated in Figure 13. In order to insulate the lower anode supporting rod means 125 in contact with the electrolyte, the parts are covered with rubber, as illustrated at 127. A rubber cap 129 is sealed over the ends of the anode members 109 which prevents undue concentration of electric current at the edges of the sheet material being treated as the same passes therealong through the electroplating tank.

In order to maintain the sheet material being treated cathodic a plurality of cathode finger members, generally designated 132, are slidably mounted on bar means 134, which, in turn, is supported by transverse rod means 136. The ends of the bar members 136 are supported on the bracket means 138 which are electrically insulated from the sides of the tank and are connected to the busbar means 140 through which cathodic electric current flows. The upper and lower anode electrodes and cathode finger members 132 are electrically connected to a generator or source of direct electric current as at 142.

The contact finger members 132 comprise inner flexible cable portion 143 which is fastened to the contact spring means 145. At the lower end of the cable means 143 is secured a copper head member 147 which is adapted to slidably contact the metal sheet material 15 as it is moved along through the plating solution. A rubber cover 150 extends over the cable and all but a small protruding end portion which makes contact with the sheet whereby the finger member is protected from the electrolytic action of the plating solution. Due to the sliding flexible contact made by the cathode fingers with the metal sheet material, the contacted head portion 147 is maintained substantially free from coating so that high efficiency of plating is effected and the use of high current densities is permitted. The spring head portion 145 of the cathode finger comprises an indentation 152 which engages in a corresponding grooved portion 154 in the supporting bar 134 and prevents the turning of the contact spring portion 145 relative to the bar 134. The spring contact portion 145, however, allows the finger to yield and swing back and forth as the sheet material moves along in contact with the head portion so that electrical connection is maintained against the sheet material at all times during its passage through the electroplating solution.

For supporting the sheet material and moving it along between the anodes, spaced co-operating pairs of guide rolls 160, which are driven by the traveling chain 20, are interconnected with rubber guide belts 162, as shown in Figure 8. Rubber guide rings 164 are positioned on the rolls 160 so as to maintain the rubber belts in proper spaced relationship. As shown in Figure 10, the sheet material is guided along between the upper and lower guide belt members 162 and maintained substantially equidistant between the anode members 108 and 109. This arrangement provides an efficient mechanism for guiding and supporting the metal sheet material while it is being moved through the plating solution without interfering with the contact of the electrolyte with all surface areas of the metal strip whereby uniform plating of the material is effected.

Figure 2A:
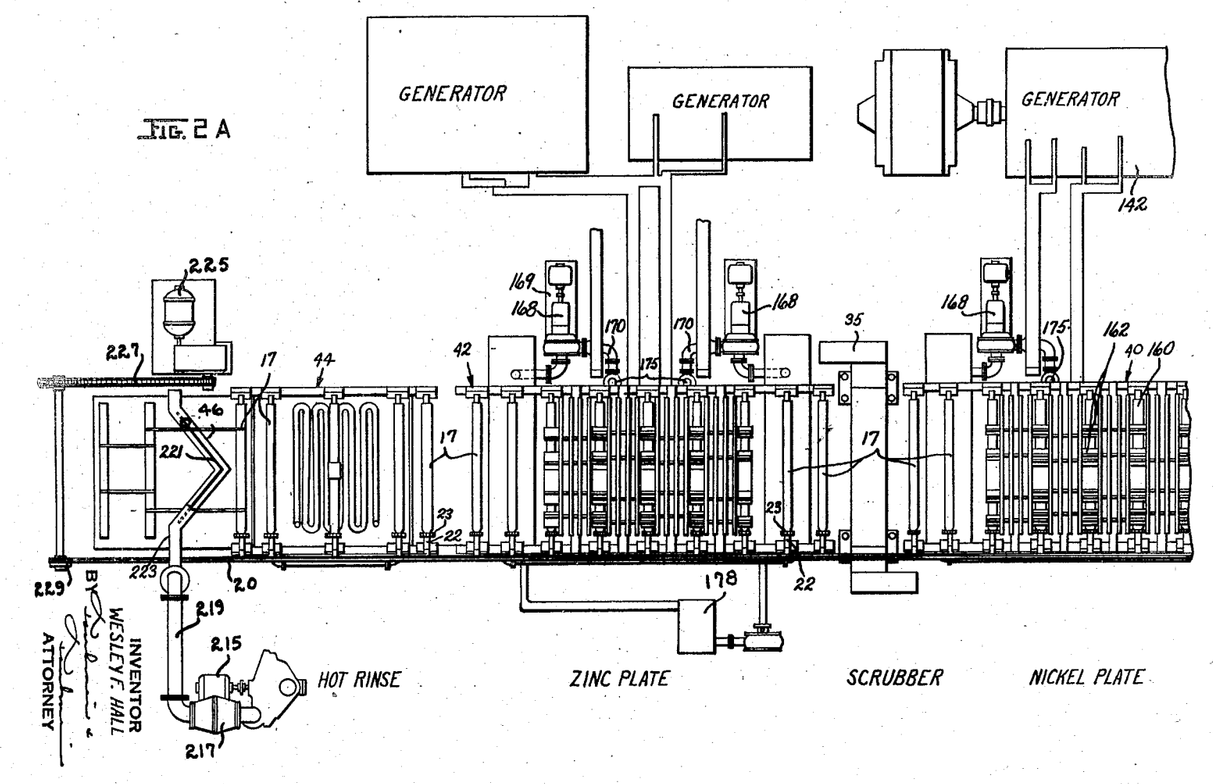
Figure 2A is a continuation of the plan view illustrated in Figure 2.
Figure 11:
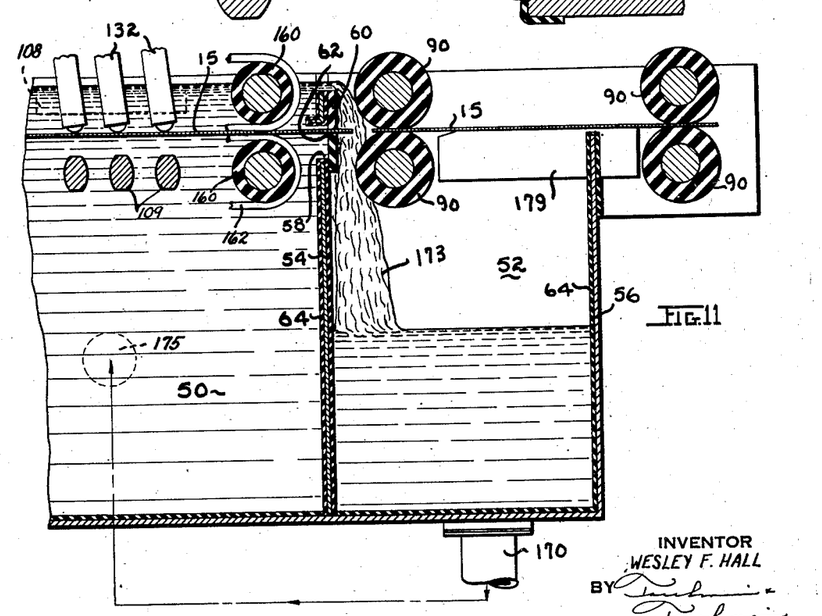
Figure 11 is a fragmentary sectional view taken through the end portion of the electroplating unit showing the arrangement of the wringer rolls and electrolyte overflow compartment.

The electrolyte for the plating units is circulated by means of the pumps 168 from the overflow compartments at the ends of the tank through the conduits 170 so that it is circulated over the anodes and metal sheet overflowing the end partitioning walls 54 into the overflow compartments, as shown at 173 in Figure 11. The electrolyte is pumped in through the side bottom portion of the plating unit, as shown at 175 in Figure 9, and flows transversely of the tank against the opposite end wall and is deflected back across the anodes by means of the angle member 177 which is fixed to the side wall of the tank, as shown in Figure 9. The path of the electrolyte is substantially as shown by the arrows. The angle member 177 is made of "Micarta" or rubber covered metal and is positioned so as to redirect the stream of electrolyte back across the sheet, which sweeps any bubbles which might be formed off the surfaces of the sheet and also prevents the electrolyte from surging upward over the side of the tank due to the high pumping pressure. The pumps have a capacity such that the electrolyte is removed and circulated back through the plating unit about every five to ten minutes. A filter means 178 is connected into the system, as shown in Figure 2A, whereby the electrolyte can be filtered when required and additional electrolyte may be added from time to time to replenish the metal removed during the plating process.

When the metal sheet material being treated reaches the end of the plating tank, it is guided out through the aperture 62 in the rubber dam board 60 and passes between the wringer rolls 90 positioned over the overflow compartment which removes substantially all of the electrolyte retained on the surface of the sheet. The sheet is then moved over the guide strips 179 and outer overflow end wall 56 and between another pair of wringer rolls 90 whereupon it passes through the spray rinse and succeeding processing units.

*Wringer roll construction and hanger support means*

Figure 6:
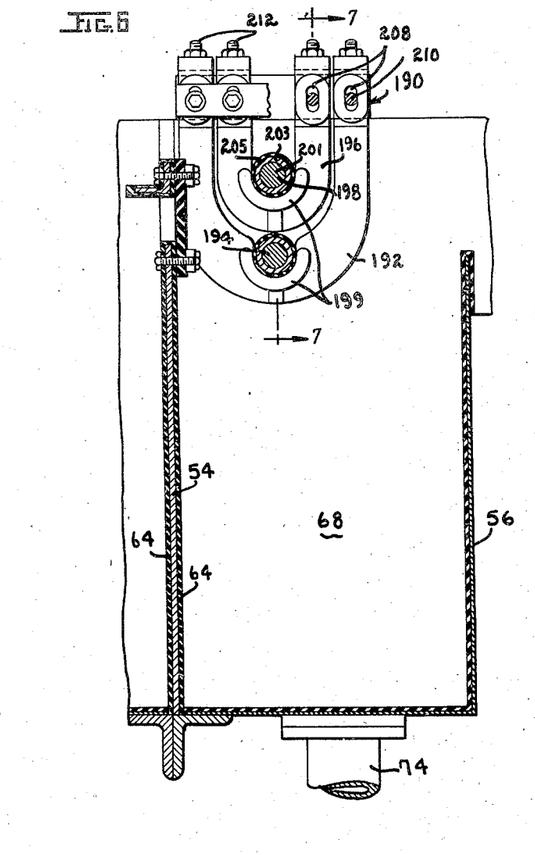
Figure 6 is an enlarged sectional view taken through the overflow compartments at the ends of the tanks and showing in elevation the detailed construction of the guide roller supports.
Figure 7:
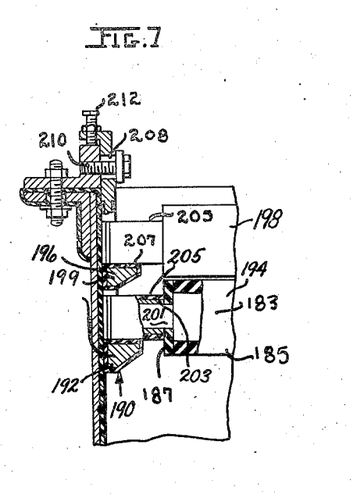
Figure 7 is a fragmentary sectional view taken substantially along the line 7—7 of Figure 6.

The wringer rolls, as illustrated in Figure 7, comprise an elongated cylindrical core 183 having a resilient rubber cover 185. The outer ends of the roll are covered with a soft rubber cap 187 and the gear means 25 is keyed to one end on a reduced shaft extension, as shown in Figures 3 and 8. The outer ends of the rolls are supported in a U-shaped hanger means, generally designated 190. This hanger support comprises an outer U-shaped member 192 arranged to support the lower wringer roll 194 while an inner smaller U-shaped member 196 is similarly arranged for providing a support for the outer ends of the upper wringer roll 198. The ends of the rolls 194 and 198 are journaled in the saddle portion 199 of the U-shaped hangers and the parts are rubber covered. As illustrated in Figure 6, the outer ends of the wringer rolls comprise a metal core 201 with a nickel bushing member 203 arranged thereover which is covered with a layer of rubber or insulating material 205. The wringer roll shaft portion 201 is adapted to rotate in its bushing 203 while the rubber surfaces 205 and 207 remain in contact with each other. Adjustment of the roll supporting hangers 190 is provided for by means of the elongated slots 208 in which the rod means 210 are positioned. The raising and lowering of the hangers are accomplished by adjusting the screws 212 at the top of the U-shaped hangers so as to raise or lower the U-shaped members relative to the supporting rod means 210. Suitable lock nuts are provided for fastening the hangers in the desired position of adjustment.

Each of the guide rolls throughout the machine is supported by U-shaped hangers, as described, and is driven at one end by means of the traveling chain 20 and co-operating sprocket means 21. The speed of the roll drive chain 20 is preferably indicated by a tachometer and is suitably controlled so as to move the sheet material through the machine at the desired rate.

After the sheet material is passed through the nickel plating and zinc plating units it travels through a spray rinse into a hot water immersion tank 44 and finally is dried by means of hot air as illustrated at 46 in Figure 1. Any suitable means for providing hot air may be employed, such as indicated in Figure 2A. The air-drying mechanism illustrated preferably comprises a motor 215 driving a suitable means such as a fan for forcing air through a heated chamber 217, through the conduit 219 and outward through the openings 221 in the vertically spaced opposed pipe means 223 between which the sheet material passes. The motor or prime mover 225 is arranged to drive the endless chain 20 by means of the member 227 and connecting sprocket gear means 229 preferably located at the end of the machine, as shown in Figures 1 and 2A. At the other end of the machine there is preferably provided a table 230 which is equipped with suitable roll means 232 and associated straight edge flange means 233 for aligning and guiding the sheets into the initial feeding rolls 17 of the machine.

In the operation of the machine, the metal sheet material which is to be treated is placed on the feeding table 230 and started through the machine, whereupon the sheet is advanced through each of the processing units at a predetermined speed which is controlled by the speed of the endless roll drive chain means 20. Cleaning, rinsing, pickling, plating, rinsing and drying of the sheet are automatically performed and controlled so as to produce a finished galvanized sheet having the desired thickness of plated coating. The various processing solutions and the sheet are maintained at the proper temperature whereby the different processes are performed at the maximum efficiency. The cold rinsing of the sheet is provided mainly to control the temperature of the sheet material as it is moved through the various processing units.

The anodes gradually dissolve in the plating solution and are replaced from time to time. The concentration of the metal in the plating tanks may be substantially controlled by either adding or subtracting anodes. It has also been found that the elliptical or pear-shaped anode members provide the proper current distribution through the electrolyte and to the sheet so that the plating of the sheet can be done at a high rate and with the use of higher current densities than has been heretofore considered feasible. Furthermore the pear-shape provides a solid body of a shape that has been found to dissolve more slowly and thus to lengthen the life of the anodes considerably as compared with other known forms. When the upper and lower anodes have been used until they have become about half dissolved, the upper anodes are unscrewed and laid upon the lower anodes and the upper anodes replaced. In this way, it is not necessary to continue to replace both the upper and lower anodes and a more efficient use of the anode electrodes is made.

The cathode fingers are used in such a number that the breakage of contact of one or more with the strip material being treated will not substantially change the distribution of the electric current passing thereto whereby a more uniform plating is effected. In the novel arrangement of the electro-galvanizing machine of this invention, the soft rubber dam boards utilized at the ends of the various processing solutions are raised above the center line of the path taken by the strip material in order to maintain a higher level of treating solution in the center tank portions during operation. The static level of the liquid is below the path of the strip and the overflow part located at the ends of the central tank portions is preferably made somewhat wider than the rest of the machine in order to provide sufficient capacity for the fluid and produce a more compact machine which can be installed in a minimum amount of space. The plating tanks are preferably sloped towards the rear of the machine and a door or other suitable removable wall means is provided whereby the plating tanks can be washed out to remove the sludge from the center compartment into the adjacent overflow compartment where it can be pumped out and discarded.

It will be understood from the foregoing description that the machine of this invention, as illustrated and described, is susceptible to various changes and modifications without departing from the spirit of the invention. It is further understood that this invention is not limited to the details of construction of the various units of the machine and that changes may be made therein to accommodate different conditions and uses to which the machine is put, within the scope of the appended claims.

Having thus fully described my invention, what I claim as new and desire to secure by Letters Patent is:

1. An electroplating unit for continuously treating metal sheets comprising an elongated compartment containing electrolyte and means for submerging and moving the sheet in the electrolyte, and containing anode and cathode means, means to cause the electrolyte to flow under and over the said metal sheets as they leave the compartment, comprising the following: said compartment having high end walls, a horizontally arranged slit located below the top of one of said end walls through which said sheets may be fed and thus be kept in constant contact with the electrolyte on all sides on their entire way through said elongated compartment, and an overflow compartment located in juxtaposition to said elongated compartment and having in common with said elongated compartment said slit end wall, said end wall being of less height at a point above said slit than the other walls of said compartment whereby the top portion of a sheet being fed through said slit will have electrolyte cascaded thereon, roller mechanism located adjacent said end wall, said overflow compartment having another wall of less height than said slit end wall, over which said sheets are guided by said roller mechanism, a drain in said overflow compartment, conduit means and a pump connection from said drain to said elongated compartment, whereby fluid which flows over the top of said slit end wall spreads over said sheets and is pumped from said end compartment back to said elongated compartment, means at the lower part of one of said side walls of said elongated compartment for receiving said pump connection, said pump maintaining the level of fluid in said overflow compartment below the level of said metal sheets and said other wall of said overflow compartment.

2. An electroplating unit for continuously treating metal sheets comprising an elongated compartment containing electrolyte and means for submerging and moving the sheet in the electrolyte, and containing anode and cathode means, means to cause the electrolyte to flow under and over the said metal sheets as they leave the compartment, comprising the following: said compartment having high end walls, a horizontally arranged slit located below the top of one of said end walls through which said sheets may be fed and thus be kept in constant contact with the electrolyte on all sides on their entire way through said elongated compartment, and an overflow compartment located in juxtaposition to said elongated compartment and having in common with said elongated compartment said slit end wall, said end wall being of less height at a point above said slit than the other walls of said compartment whereby the top portion of a sheet being fed through said slit will have electrolyte cascaded thereon, roller mechanism located adjacent said end wall, said overflow compartment having another wall of less height than said slit end wall, over which said sheets are guided by said roller mechanism, a drain in said overflow compartment, conduit means and a pump connection from said drain to said elongated compartment, whereby fluid which flows over the top of said slit end wall spreads over said sheets and is pumped from said end compartment back to said elongated compartment, means at the lower part of one of said side walls of said elongated compartment for receiving said pump connection; a deflector plate at the side wall opposite said pump connection, said pump maintaining the level of fluid in said overflow compartment below the level of said metal sheets and said other wall of said overflow compartment.

3. An electroplating unit for continuously treating metal sheets comprising an elongated compartment containing electrolyte and means for submerging and moving the sheet in the electrolyte, and containing anode and cathode means, means to cause the electrolyte to flow under and over the said metal sheets as they leave the compartment, comprising the following: said anode means comprising lower and upper units and means for equidistantly spacing said units from said cathode means, said compartment having high end walls, a horizontally arranged slit located below the top of one of said end walls through which said sheets may be fed and thus be kept in constant contact with the electrolyte on all sides on their entire way through said elongated compartment, and an overflow compartment located in juxtaposition to said elongated compartment and having in common with said elongated compartment said slit end wall, said end wall being of less height at a point above said slit than the other walls of said compartment whereby the top portion of a sheet being fed through said slit will have electrolyte cascaded thereon, roller mechanism located adjacent said end wall, said overflow compartment having another wall of less height than said slit end wall, over which said sheets are guided by said roller mechanism, a drain in said overflow compartment, conduit means and a pump connection from said drain to said elongated compartment, whereby fluid which flows over the top of said slit end wall spreads over said sheets and is pumped from said end compartment back to said elongated compartment, said pump maintaining the level of fluid in said overflow compartment below the level of said metal sheets and said other wall of said overflow compartment.

4. An electroplating unit for continuously treating metal sheets comprising an elongated compartment containing electrolyte and means for submerging and moving the sheet in the electrolyte, and containing anode and cathode means, means to cause the electrolyte to flow under and over the said metal sheets as they leave the compartment, comprising the following: said anode means comprising lower and upper units each of said units comprising a series of metal bars and means for equidistantly spacing said units from said cathode means, said compartment having high end walls, a horizontally arranged slit located below the top of one of said end walls through which said sheets may be fed and thus be kept in constant contact with the electrolyte on all sides on their entire way through said elongated compartment, and an overflow compartment located in juxtaposition to said elongated compartment and having in common with said elongated compartment said slit end wall, said end wall being of less height at a point above said slit than the other walls of said compartment whereby the top portion of a sheet being fed through said slit will have electrolyte cascaded thereon, roller mechanism located adjacent said end wall, said overflow compartment having another wall of less height than said slit end wall, over which said sheets are guided by said roller mechanism, a drain in said overflow compartment, conduit means and a pump connection from said drain to said elongated compartment, whereby fluid which flows over the top of said slit end wall spreads over said sheets and is pumped from said end compartment back to said elongated compartment, said pump maintaining the level of fluid in said overflow compartment below the level of said metal sheets and said other wall of said overflow compartment.

5. An electroplating unit for continuously treating metal sheets comprising an elongated compartment containing electrolyte and means for submerging and moving the sheet in the electrolyte, and containing anode and cathode means, means to cause the electrolyte to flow under and over the said metal sheets as they leave the compartment, comprising the following: said anode means comprising lower and upper units each of said units comprising a series of horizontal metal bars, the bars of said upper units being vertically arranged with regard to those of said lower units, and means for equidistantly spacing said units from said cathode means, said compartment having high end walls, a horizontally arranged slit located below the top of one of said end walls through which said sheets may be fed and thus be kept in constant contact with the electrolyte on all sides on their entire way through said elongated compartment, and an overflow compartment located in juxtaposition to said elongated compartment and having in common with said elongated compartment said slit end wall, said end wall being of less height at a point above said slit than the other walls of said compartment whereby the top portion of a sheet being fed through said slit will have electrolyte cascaded thereon, roller mechanism located adjacent said end wall, said overflow compartment having another wall of less height than said slit end wall, over which said sheets are guided by said roller mechanism, a drain in said overflow compartment, conduit means and a pump connection from said drain to said elongated compartment, whereby fluid which flows over the top of said slit end wall spreads over said sheets and is pumped from said end compartment back to said elongated compartment, said pump maintaining the level of fluid in said overflow compartment below the level of said metal sheets and said other wall of said overflow compartment.

6. An electroplating unit for continuously treating metal sheets comprising an elongated compartment containing electrolyte and means for submerging and moving the sheet in the electrolyte, and containing anode and cathode means, means to cause the electrolyte to flow under and over the said metal sheets as they leave the compartment, comprising the following: said compartment having high end walls, a horizontally arranged slit located below the top of one of said end walls through which said sheets may be fed and thus be kept in constant contact with the electrolyte on all sides on their entire way through said elongated compartment, and an overflow compartment located in juxtaposition to said elongated compartment and having in common with said elongated compartment said slit end wall, said end wall being of less height at a point above said slit than the other walls of said compartment whereby the top portion of a sheet being fed through said slit will have electrolyte cascaded thereon, roller mechanism located adjacent said end wall, said overflow compartment having another wall of less height than said slit end wall, and means comprising coacting wringer rolls, over which said sheets are guided by said roller mechanism, a drain in said overflow compartment, conduit means and a pump connection from said drain to said elongated compartment, whereby fluid which flows over the top of said slit end wall spreads over said sheets and is pumped from said end compartment back to said elongated compartment, said pump maintaining the level of fluid in said overflow compartment below the level of said metal sheets and said other wall of said overflow compartment.

7. An electroplating unit for continuously treating metal sheets comprising an elongated compartment containing electrolyte and means for submerging and moving the sheet in the electrolyte, and containing anode and cathode means, said anode means comprising lower and upper units each consisting of a series of horizontal metal bars of pear-shaped cross section, the bars of said upper units being arranged crosswise with regard to those of said lower units, means for equidistantly spacing said units from said cathode means; said compartment having high end walls at each end thereof, horizontally arranged slits located below the top of each of said end walls through which said sheets may be fed and thus be kept in constant contact with the electrolyte on all sides on their entire way through said elongated compartment; slidable contact members for cathodically connecting said metal sheets; overflow compartments located in juxtaposition to said elongated compartment adjacent each end thereof, each overflow compartment having in common with said elongated compartment one of said slit end walls; said overflow compartments having another wall of less height than said slit end wall and means comprising coacting wringer and sheet guiding rolls; drains in said overflow compartments, means for connecting said drains of said overflow compartments; a pump connection from said drains connecting means, means at the lower part of one of said side walls of said elongated compartment for receiving said pump connection; and a deflector plate at the side wall opposite said pump connection.

WESLEY F. HALL.